US008015078B1

(12) United States Patent
Scalora et al.

(10) Patent No.: US 8,015,078 B1
(45) Date of Patent: Sep. 6, 2011

(54) METHOD AND APPARATUS FOR DISPLAYING QUANTITIES OF INVENTORY ITEMS IN MULTIPLE UNITS OF MEASURE

(75) Inventors: Michael Amore Scalora, Orem, UT (US); Walter Morse Holladay, Lindon, UT (US); James Parker Ferry, Cedar Hills, UT (US); Bradley R. Lamb, Pleasant Grove, UT (US)

(73) Assignee: Intuit Inc., Mountain View, CA (US)

( * ) Notice: Subject to any disclaimer, the term of this patent is extended or adjusted under 35 U.S.C. 154(b) by 1376 days.

(21) Appl. No.: 11/491,432

(22) Filed: Jul. 20, 2006

(51) Int. Cl.
*G06Q 10/00* (2006.01)
(52) U.S. Cl. .......................................... 705/28
(58) Field of Classification Search ................ 705/28
See application file for complete search history.

(56) References Cited

U.S. PATENT DOCUMENTS

| | | | | |
|---|---|---|---|---|
| 4,100,602 A | * | 7/1978 | Shapiro | 708/206 |
| 5,715,402 A | * | 2/1998 | Popolo | 705/37 |
| 7,664,684 B2 | * | 2/2010 | Boerner et al. | 705/28 |
| 2005/0144206 A1 | * | 6/2005 | Baumann | 708/204 |
| 2006/0041463 A1 | * | 2/2006 | Yoshida et al. | 705/10 |
| 2007/0112608 A1 | * | 5/2007 | Avery et al. | 705/8 |
| 2008/0103824 A1 | * | 5/2008 | Francis et al. | 705/2 |

OTHER PUBLICATIONS

McDowell, Kevin "AACE International Transactions." AEE Journal 2008: 41-45.*

* cited by examiner

*Primary Examiner* — Matthew S Gart
*Assistant Examiner* — Oluseye Iwarere
(74) *Attorney, Agent, or Firm* — Gunnison, McKay & Hodgson, L.L.P.; Philip McKay

(57) ABSTRACT

A method and apparatus for displaying quantities of inventory items in multiple units of measure includes displaying an inventory item listing, including a desired quantity of the inventory item, on a user interface and/or display screen. The inventory item listing is then activated by a user through a user interface device within the context of the present transaction. Once the inventory item listing is activated, the quantity of the inventory item desired is displayed in a multiple units of measure display in multiple units of measure associated with the inventory item and within the context of the present transaction.

8 Claims, 9 Drawing Sheets

300A

| Create Transaction | | | | | |
|---|---|---|---|---|---|
| Vendor 301 | 303 Transaction # | | | 305 Transaction type | |
| Hometown Hardware | 1-0001 | | | Purchase Order | |

From

Hometown Hardware
111 First Street
Hometown, Home State
11111            307

To

Customer Number 1
222 Second Street
Hometown, Home State
11111            309

Date 311  1/1/2007    ACCT. # 313  1234

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | 500.00 | 500.0 |
| 367 | Chain | Chain, reel | 1/2 | 180.00 | 90.00 |
| | 351 | 353 | 355 | 357 | 359 |
| | | | | 371 Sub-total | 953.00 |
| | | | | 373 Tax | 9.53 |
| | | | | 375 Shipping | 00.00 |
| | | | | 377 Total | 962.53 |

Create Transaction

Vendor 301 | 303 Transaction # | 305 Transaction type
Hometown Hardware | 1-0001 | Purchase Order From
Hometown Hardware
111 First Street    307
Hometown, Home State
11111

To
Customer Number 1
222 Second Street    309
Hometown, Home State
11111

Date 1/1/2007    ACCT. # 1234
311                  313

350

| Item | Description | Qty | Rate | Amount |
|---|---|---|---|---|
| Tinting Film | Tinting film, 36" roll | 4 | 78.00 | 312.00 |
| Red Paint | Red Paint, can | 2 | | 51.00 |
| Vinyl Flooring | Vinyl Flooring, sheet | 1 | | 500.0 |
| Chain | Chain, reel | 1/2 | 180.00 | 90.00 |
| 351 | 353 | 355 | 357 | 359 |

361, 363, 365, 367

4 Rolls
44 lbs.
320 ft.    381

371 Sub-total    953.00
373 Tax          9.53
375 Shipping     00.00
377 Total        962.53

| Create Transaction | | |
|---|---|---|
| Vendor 301 | 303 Transaction # | 305 Transaction type |
| Hometown Hardware | 1-0001 | Purchase Order |

From

Hometown Hardware
111 First Street
Hometown, Home State
11111       307

To

Customer Number 1
222 Second Street
Hometown, Home State
11111       309

Date 311: 1/1/2007     ACCT. # 313: 1234

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | | 500.0 |
| 367 | Chain | Chain, reel | 1/2 | | 90.00 |
| | 351 | 353 | 355 | 357 | 359 |

383: 2 cans / 2 Gal. / 8 Qts. / 16 Pts. / 20 Lbs.

| | |
|---|---|
| 371 Sub-total | 953.00 |
| 373 Tax | 9.53 |
| 375 Shipping | 00.00 |
| 377 Total | 962.53 |

Create Transaction

Vendor 301     303 Transaction #     305 Transaction type

| Hometown Hardware | 1-0001 | Purchase Order |

From

| Hometown Hardware<br>111 First Street<br>Hometown, Home State<br>11111 | 307 |

To

| Customer Number 1<br>222 Second Street<br>Hometown, Home State<br>11111 | 309 |

Date 311 | 1/1/2007 |    ACCT. # 313 | 1234 |

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | 500.00 | 500.0 |
| 367 | Chain | Chain, reel | 1/2 | | 90.00 |
| | 351 | 353 | 355 | 357 | 359 |

385: 1 sheet / 10 Sq. Yd. / 90 Sq. Ft. / 200 Lbs.

| | 371 Sub-total | 953.00 |
| | 373 Tax | 9.53 |
| | 375 Shipping | 00.00 |
| | 377 Total | 962.53 |

Create Transaction

Vendor 301
Hometown Hardware

303
Transaction #
1-0001

305
Transaction type
Purchase Order

From
Hometown Hardware
111 First Street
Hometown, Home State
11111         307

To
Customer Number 1
222 Second Street
Hometown, Home State
11111         309

Date 311  1/1/2007    ACCT. # 313  1234

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | 500.00 | 500.0 |
| 367 | Chain | Chain, reel | 1/2 | 180.00 | 90.00 |
| | 351 | 353 | 355 | 357 | 359 |

1/2 reel
30 Mtr.
32.8 Yd.
98.4 Ft.
1181 In.
90. Lbs.   387

371 Sub-total    953.00
373 Tax           9.53
375 Shipping     00.00
377 Total       962.53

FIG. 3E

METHOD AND APPARATUS FOR DISPLAYING QUANTITIES OF INVENTORY ITEMS IN MULTIPLE UNITS OF MEASURE

BACKGROUND

Currently, various computing system implemented financial management systems are available including: computing system implemented business financial management systems; computing system implemented sales and inventory tracking systems; computing system implemented tax preparation systems; computing system implemented business accounting systems; and computing system implemented medical expense management systems; as well as various other electronic transaction data driven financial management systems.

Computing system implemented small business financial management systems and computing system implemented sales and inventory tracking systems help users: manage and track inventory; track sales and purchases; manage expenses; manage payroll and taxes; and generate various documents associated with business and inventory operations such as purchases orders, item lists, available inventory reports, receipts, and various other transaction forms and documents.

Many users of computing system implemented small business financial management systems and computing system implemented sales and inventory tracking systems, typically small business owners or their employees, often deal in large quantities of assorted inventory items. Often these assorted inventory items are bought and/or kept in inventory and/or sold using units of measure particular to the inventory item. Consequently, managing the purchasing, warehousing, and sale of these assorted inventory items, and tracking and documenting transactions involving the inventory items, using current computing system implemented small business financial management systems and computing system implemented sales and inventory tracking systems is quite complicated and often involves a great deal of time and manual input on the part of the user.

Further complicating the situation is the fact that many inventory items are purchased in quantities using one unit of measure, are entered into inventory and tracked using another unit of measure, and are sold to customers who wish to purchase the items using one or more other units of measure. In addition, when shipping various inventory items, yet another unit of measure typically needs to be determined.

As an example, some inventory items, such as carpet or tinting film, may be sold by the manufacturer in rolls. The same inventory item may then be stocked by a user, such as a retail store owner, and entered into the user's current computing system implemented small business financial management system and/or computing system implemented sales and inventory tracking system, in units of length, such as feet, yards or inches. A customer buying the inventory item may then want to purchase the material based on units of area, such as square feet, square yards, or square inches. Finally, to ship the inventory item, the user may need to know the weight per roll, or fraction of a roll, of the inventory item. Consequently, in this example, the same inventory item involves as many as four general types of units of measure, i.e., rolls, length, area, and weight, and four or more specific sub-units of measure such as yards, feet, inches and pounds. In addition, this does not include the complications introduced by international units such a metric units of measure vs. American standard units of measure.

Current computing system implemented small business financial management systems and computing system implemented sales and inventory tracking systems typically provide for only one unit of measure, either as a default or as user defined. Consequently, when either purchasing inventory items, warehousing or tracking inventory items, or selling inventory items, an employee or owner is often required to leave the task at hand, i.e., the purchase, inventorying, or sale of an inventory item, and look up conversion ratios between various units, and then convert units, either by head, hand, or using some other calculation means. Consequently, a significant amount of employee and/or business owner time is often utilized in making these conversions and multiple opportunities for error are introduced in the process.

SUMMARY

In accordance with one embodiment, a method and apparatus for displaying quantities of inventory items in multiple units of measure includes a process and/or application for displaying quantities of inventory items in multiple units of measure.

In one embodiment, an inventory item listing, including a selected quantity of the inventory item in base, or first, units of measure is displayed on a user interface and/or display screen. The inventory item listing is then activated by a user through a user interface device. In one embodiment, the inventory item listing is activated through the same user interface screen and within the context of the present transaction.

In one embodiment, once the inventory item listing is activated, equivalent quantities of the selected quantity of inventory item are displayed in a multiple units of measure display, in multiple units of measure associated with the inventory item. In one embodiment, the selected quantity of the inventory item is displayed by the multiple units of measure display in the same user interface screen and within the context of the present transaction.

Using the method and apparatus for displaying quantities of inventory items in multiple units of measure disclosed herein, a user selected quantity of an inventory item is displayed in multiple units of measure associated with the inventory item in the multiple units of measure display so that the conversion of units is provided automatically, without additional calculation, user effort, or opportunity for error.

In addition, in one embodiment, the method and apparatus for displaying quantities of inventory items in multiple units of measure disclosed herein displays a user selected quantity of an inventory item in multiple units of measure associated with the inventory item in the multiple units of measure display within the context of a single interface display screen and within the context of the present transaction. Consequently, purchases, warehousing, and sales of the inventory item can be conducted and concluded without ever having to leave the context of the present transaction or the present display screen.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3A is a representation of one embodiment of a display screen layout in accordance with one embodiment of a process and/or application for displaying quantities of inventory items in multiple units of measure;

FIG. 3A is a representation of one embodiment of a display screen layout in accordance with one embodiment of a process and/or application for displaying quantities of inventory items in multiple units of measure;

FIG. 3B is a representation of one embodiment of a display screen layout including a multiple units of measure display in accordance with one embodiment of a process and/or application for displaying quantities of inventory items in multiple units of measure;

FIG. 3C is a representation of one embodiment of a display screen layout including a multiple units of measure display in accordance with one embodiment of a process and/or application for displaying quantities of inventory items in multiple units of measure;

FIG. 3D is a representation of one embodiment of a display screen layout including a multiple units of measure display in accordance with one embodiment of a process and/or application for displaying quantities of inventory items in multiple units of measure;

FIG. 3E is a representation of one embodiment of a display screen layout including a multiple units of measure display in accordance with one embodiment of a process and/or application for displaying quantities of inventory items in multiple units of measure;

Figure 1:
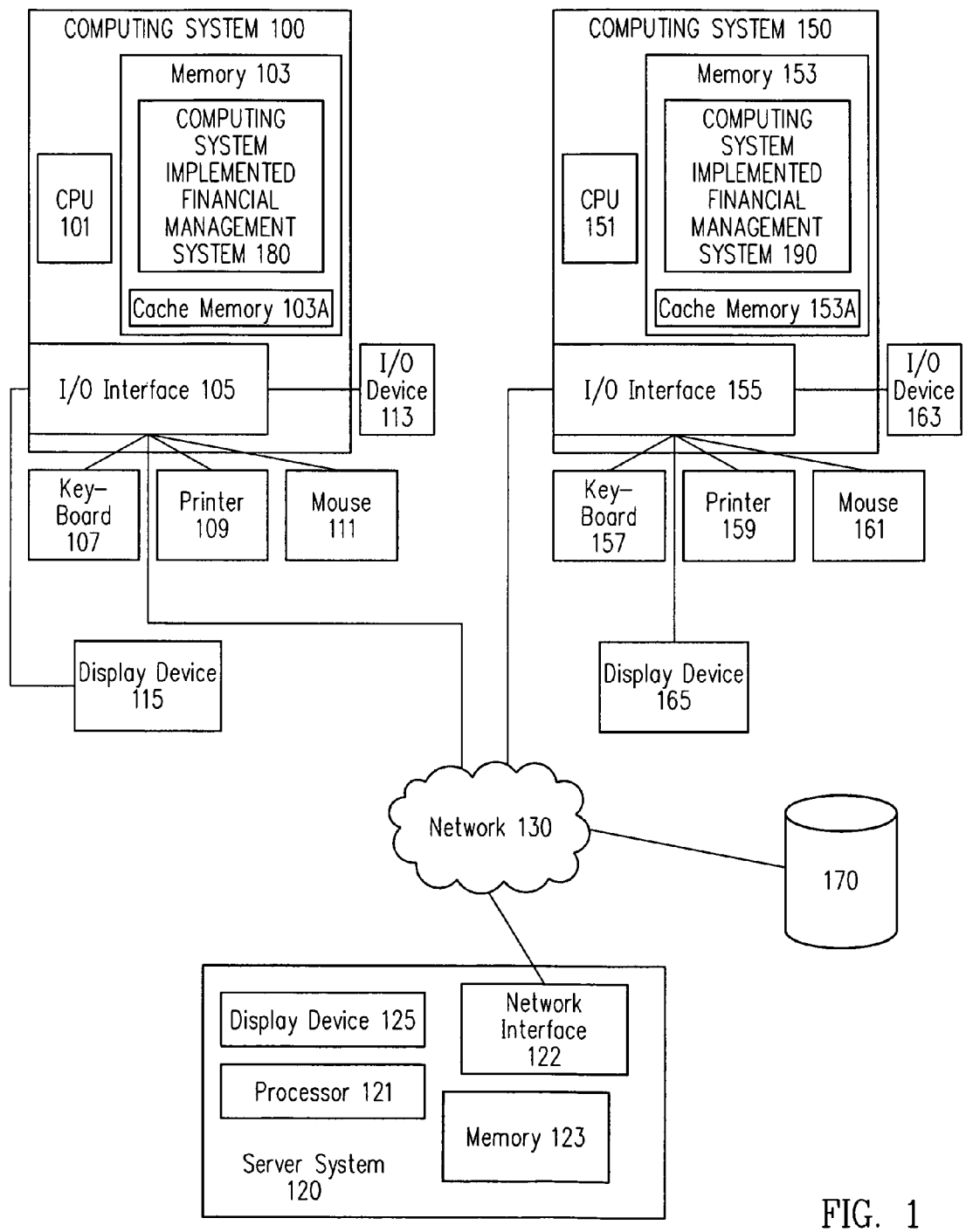
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In addition, the particular display screen layouts, appearance, and terminology as depicted and described herein, are intended to be illustrative and exemplary only, and in no way limit the scope as claimed.

In accordance with one embodiment, a method and apparatus for displaying quantities of inventory items in multiple units of measure includes a process (200 in FIG. 2) and/or application (401 in FIG. 4) for displaying quantities of inventory items in multiple units of measure.

In one embodiment, an inventory item listing, including a selected quantity of the inventory item in base, or first, units of measure is displayed on a user interface and/or display screen. The inventory item listing is then activated by a user through a user interface device. In one embodiment, the inventory item listing is activated through the same user interface screen and within the context of the present transaction.

In one embodiment, once the inventory item listing is activated, equivalent quantities of the selected quantity of the inventory item are displayed in a multiple units of measure display, in multiple units of measure associated with the inventory item. In one embodiment, the selected quantity of the inventory item is displayed by the multiple units of measure display in the same user interface screen and within the context of the present transaction.

Using the method and apparatus for displaying quantities of inventory items in multiple units of measure disclosed herein, a user selected quantity of an inventory item is displayed in multiple units of measure associated with the inventory item in the multiple units of measure display so that the conversion of units is provided automatically, without additional calculation, user effort, or opportunity for error.

In addition, in one embodiment, the method and apparatus for displaying quantities of inventory items in multiple units of measure disclosed herein displays a user selected quantity of an inventory item in multiple units of measure associated with the inventory item in the multiple units of measure display within the context of a single interface display screen and within the context of the present transaction. Consequently, purchases, warehousing, and sales of the inventory item can be conducted and concluded without ever having to leave the context of the present transaction or the present display screen.

As used herein, the term computing system implemented financial management system includes, but is not limited to: computing system implemented business systems, packages, programs, modules, or applications; computing system implemented inventory and sales tracking systems, packages, programs, modules, or applications; computing system implemented personal and small business financial management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether available or known at the time of filing or as developed later.

For illustrative purposes, embodiments are described within the framework of, and using, one or more computing system implemented inventory and sales tracking systems and/or computing system implemented business financial management systems and/or computing system implemented business accounting management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

As used herein, the term inventory item includes virtually any physical or non-physical commodity that is associated with, and is sold, used, transferred, traded, or otherwise employed, by a user of a process for displaying quantities of inventory items in multiple units of measure, such as process for displaying quantities of inventory items in multiple units of measure 200, discussed below. Consequently, any units desired by the user for describing, categorizing, quantifying, qualifying, identifying, or in any other way reflecting an attribute of an inventory item, are capable of, and are envisioned as, being processed by a process for displaying quantities of inventory items in multiple units of measure, such as process for displaying quantities of inventory items in multiple units of measure 200.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian® OS, Windows® Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the computing system implemented financial management systems described herein make use of input provided to the computer device implementing the process and/or application for displaying quantities of inventory items in multiple units of measure, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a method and apparatus for displaying quantities of inventory items in multiple units of measure, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented financial management systems 180 stored, in whole, or in part, therein, that are used by, or include, as discussed below, a process and/or application for displaying quantities of inventory items, such as process 200 and application 401 discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process and/or application for displaying quantities of inventory items, such as process 200 and application 401, and a computing system implemented financial management system 180, can be loaded, in whole, or in part, into computing system 100 via I/O device 113, such as from a CD, DVD or floppy disk containing all, or part, of computing system implemented financial management system 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented financial management systems 190 stored, in whole, or in part, therein, that are used by, or include, as discussed below, a process and/or application for displaying quantities of inventory items, such as process 200 and application 401.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process and/or application for displaying quantities of inventory items, such as process 200 and application 401, and a computing system implemented financial management system 190, can be loaded, in whole, or in part, into computing system 150 via I/O device 163, such as from a CD, DVD or floppy disk containing all, or part, of computing system implemented financial management system 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process and/or application for displaying quantities of inventory items, such as process 200 and application 401, and/or computing system implemented financial management system 180 and/or computing system implemented financial management system 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process and/or application for displaying quantities of inventory items, such as process 200 and application 401, and a computing system implemented financial management system 180 and/or computing system implemented financial management system 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process and/or application for displaying quantities of inventory items, such as process 200 and application 401, and a computing system implemented financial management system 180 and/or computing system implemented financial management system 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for displaying quantities of inventory items in multiple units of measure, such as process for displaying quantities of inventory items in multiple units of measure 200, and/or an application for displaying quantities of inventory items in multiple units of measure, such as application for displaying quantities of inventory items in multiple units of measure 401, and a computing system implemented financial management system, are sometimes referred to herein, alternatively, as a process, an application, a module, a program, a component of a software system, a component of a software package, a component of a parent system, or a feature of a parent system, this terminology is illustrative only. In some embodiments, a process and/or application for displaying quantities of inventory items, such as process 200 and application 401, and a computing system implemented financial management system, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process and/or application for displaying quantities of inventory items, such as process 200 and application 401, and a computing system implemented financial management system, discussed herein, by processor 101, processor 151, or server system processor 121, results in the operations of an agent computer process (not shown) and/or a rule computer process (not shown).

In one embodiment, a process and/or application for displaying quantities of inventory items, such as process 200 and application 401, and a computing system implemented financial management system, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removed from the computing system.

For example, all, or part, of a process and/or application for displaying quantities of inventory items, such as process 200 and application 401, and a computing system implemented financial management system, discussed herein, may be stored in a memory that is physically located in a location, such as server system memory 123, or database 170, of FIG. 1, different from a computing system, such as computing systems 100 and/or 150 of FIG. 1, utilizing a process and/or application for displaying quantities of inventory items, such as process 200 and application 401, and a computing system implemented financial management system. In one embodiment, all, or part, of a process and/or application for displaying quantities of inventory items, such as process 200 and application 401, and a computing system implemented financial management system, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server system, such as computing systems 100 and/or 150 and/or server system 120 of FIG. 1, running and/or utilizing and/or storing all, or part, of a process and/or application for displaying quantities of inventory items, such as process 200 and application 401, and a computing system implemented financial management system, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process and/or application for displaying quantities of inventory items, such as process 200 and application 401, and a computing system implemented financial management system, discussed herein, in accordance with at least one of the embodiments as described herein. Similarly, in another embodiment, a process and/or application for displaying quantities of inventory items, such as process 200 and application 401, and a computing system implemented financial management system, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

Figure 2:
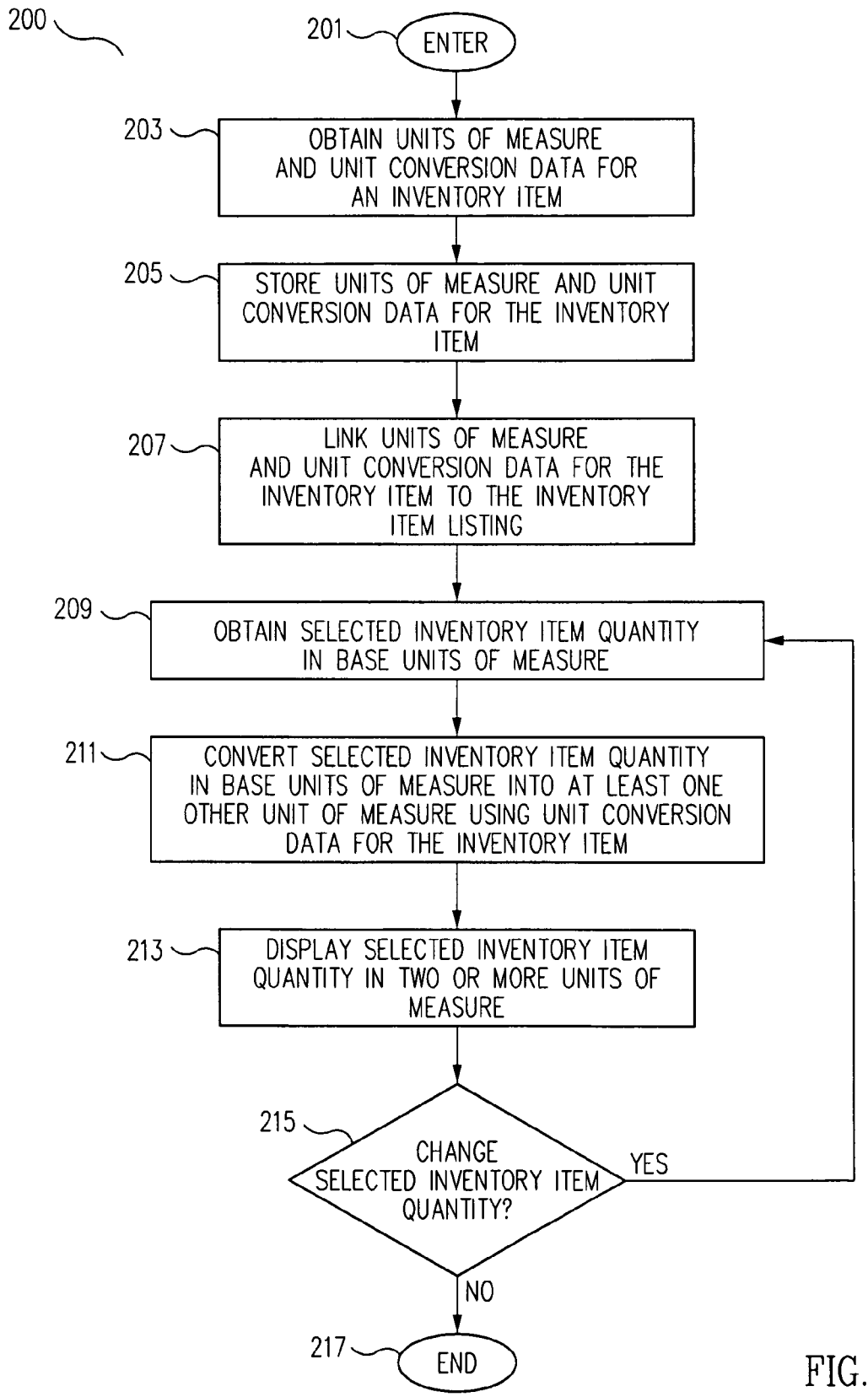
FIG. 2 is a flow chart depicting a process for displaying quantities of inventory items in multiple units of measure in accordance with one embodiment.

FIG. 2 is a flow chart depicting a process for displaying quantities of inventory items in multiple units of measure 200 in accordance with one embodiment. Process for displaying quantities of inventory items in multiple units of measure 200 begins at ENTER OPERATION 201 and process flow proceeds to OBTAIN UNITS OF MEASURE AND UNIT CONVERSION DATA FOR AN INVENTORY ITEM OPERATION 203.

At OBTAIN UNITS OF MEASURE AND UNIT CONVERSION DATA FOR AN INVENTORY ITEM OPERATION 203, data is obtained that represents various units of measure associated with a particular inventory item and conversion ratios for converting the various units of measure associated with the particular inventory item.

For instance, continuing with the example discussed above, if the particular inventory item is a roll of material, data representing units of measure such as: roll; weight per roll, such as pounds per roll; linear length, such as feet or inches per roll; linear width, such as feet or inches; and area per roll, such as square feet or inches per roll, is obtained at OBTAIN UNITS OF MEASURE AND UNIT CONVERSION DATA FOR AN INVENTORY ITEM OPERATION 203.

As another example, if the particular inventory item is a liquid, such as paint, data representing units of measure such as: can; weight per can, such as pounds per can; liquid quantity per can, such as gallons per can and/or quarts per can and/or pints per can, etc., is obtained at OBTAIN UNITS OF MEASURE AND UNIT CONVERSION DATA FOR AN INVENTORY ITEM OPERATION 203.

As a further example, if the particular inventory item is manufactured in sheets, such as vinyl flooring or area rugs, data representing units of measure such as: sheet; weight per sheet, such as pounds per sheet; square feet per sheet; and square yards per sheet is obtained at OBTAIN UNITS OF MEASURE AND UNIT CONVERSION DATA FOR AN INVENTORY ITEM OPERATION 203.

As a further example, if the particular inventory item is manufactured or sold in reels, such as chain of wire, data representing units of measure such as: reel; weight per reel, such as pounds per reel; and linear length per reel, such as yard, meter, foot, centimeter, or inch per reel is obtained at OBTAIN UNITS OF MEASURE AND UNIT CONVERSION DATA FOR AN INVENTORY ITEM OPERATION 203.

In addition, in other embodiments, data representing any attributes of any physical inventory item, or collection of inventory items, that serve to categorize, describe, quantify, qualify, or in any other way reflect a physical or non-physical attribute of an inventory item, or collection of inventory items, in one or more units, including but not limited to: volume; weight; area; capacity; quality; quantity; etc., can, along with various conversions between the units, be obtained at OBTAIN UNITS OF MEASURE AND UNIT CONVERSION DATA FOR AN INVENTORY ITEM OPERATION 203 in accordance with the needs of the user.

In addition, process for displaying quantities of inventory items in multiple units of measure 200 is not limited to use with traditional physical inventory items. In some embodiments, the inventory items are usage, and/or electronic and/or digital in nature and include, but are not limited to: electronic data transfer; data storage capacity; data processing capacity; program usage time; processor or CPU usage time; or any other electronic or non-electronic usage and/or capacity based inventory item expressed in various appropriate traditional or non-traditional units.

As an example, a utility company, such as electric company, has inventory in the form of the capacity to provide electrical power. The electric company may produce electricity in terms of cost, or natural resource consumed, per kilowatt (production cost/kw). Consequently, the electric company may internally use units such as liquid volume of gas per kilowatt, flow of water per kilowatt or cost per kilowatt produced. On the other hand, the consumer is typically charged per kilowatt hour, i.e., cost per kilowatt hour (cost/kilowatt/hour). In addition, the consumer may desire to know how many appliances can be run per kilowatt hour. Using process for displaying quantities of inventory items in multiple units of measure 200 any or all of these units, and their conversion factors, are obtained at OBTAIN UNITS OF MEASURE AND UNIT CONVERSION DATA FOR AN INVENTORY ITEM OPERATION 203.

As another example, an Internet based data service, such as a content provider, web hosting service, an Internet gaming service, or data storage provider, may provide data and/or storage capacity and/or digital content to its customers. In this instance, the data service's inventory item is the data and/or transfer rates of data and/or storage capacity for data. In this case, one way to measure total inventory would be total data, data storage, or data transfer, capacity, typically expressed in bytes of data, such as in gigabytes, and/or data transfer bandwidth, available. However, the data service provider's total transfer or storage capacity would typically be sold to a customer in units of gigabytes of data per month, or other unit of time (GB/unit of time) and/or data transfer rates, etc. In addition, the data service provider may track inventory, in this case inventory of data transfer or storage capacity, in terms of the number of customers per unit of time that can be serviced by their total data storage or transfer capacity, i.e., number of customers/per unit of time. In addition, in some instances, the data and/or transfer rates of data and/or storage capacity for data may be of most use to the customer when expressed in terms of units of an item that can be provided. For instance, the customer may be most interested in: how many digital photographs can be produced/obtained/stored per gigabyte of data; how many songs can be produced/obtained/stored per gigabyte of data; how many movies can be produced/obtained/stored per gigabyte of data; how many documents can be produced/obtained/stored per gigabyte of data; how many programs can be run per processor capacity provided; etc. Using process for displaying quantities of inventory items in multiple units of measure 200 any, or all, of these units, or any other units desired by the user, and their conversion factors, are obtained at OBTAIN UNITS OF MEASURE AND UNIT CONVERSION DATA FOR AN INVENTORY ITEM OPERATION 203.

In addition, in other embodiments, data representing any attributes of data or usage based inventory items, or collections of data and usage based inventory items, that serve to categorize, describe, quantify, qualify, or in any other way reflect an attribute of the data or usage based inventory item, in one or more units, including but not limited to: capacity; transfer rates; time; usage; etc., can, along with various conversions between the units, be obtained at OBTAIN UNITS OF MEASURE AND UNIT CONVERSION DATA FOR AN INVENTORY ITEM OPERATION 203 in accordance with the needs of the user.

In addition, process for displaying quantities of inventory items in multiple units of measure 200 can implemented in the more general service sector, where the inventory item is based on the service provider's, or service provider employee's time. As an example, a service provider's primary inventory item may be available man-hours. However, the total available man-hours would typically be sold to a customer in units of jobs or man-hours per job (man-hours/job). In addition, the service provider may wish to track his or her inventory, i.e., total man-hours, in terms of the number of jobs that can be completed per month (jobs/month). In addition, when the service provided results in a tangible or semi-tangible item, such as a legal document, a tax return, an medical procedure performed, a car waxed, or a house cleaned, both the service provider and the customer may desire that the inventory item be expressed in terms of tangible or semi-tangible items capable of being produced per unit of time. Using process for displaying quantities of inventory items in multiple units of measure 200 any, or all, of these units, or any other units desired by the user, and their conversion factors, are obtained at OBTAIN UNITS OF MEASURE AND UNIT CONVERSION DATA FOR AN INVENTORY ITEM OPERATION 203.

As discussed above, as used herein, the term inventory item includes virtually any physical or non-physical commodity that is associated with, and is sold, used, transferred, traded, or otherwise employed, by a user of process for displaying quantities of inventory items in multiple units of measure 200. Consequently, any units desired by the user for describing, categorizing, quantifying, qualifying, identifying, or in any other way reflecting an attribute of an inventory item, are capable of, and are envisioned as, being processed by process for displaying quantities of inventory items in multiple units of measure 200, and therefore, are obtained, along with their conversion ratios, at OBTAIN UNITS OF MEASURE AND UNIT CONVERSION DATA FOR AN INVENTORY ITEM OPERATION 203.

In one embodiment, data representing the various units of measure and conversion ratios for a given inventory item is obtained at OBTAIN UNITS OF MEASURE AND UNIT CONVERSION DATA FOR AN INVENTORY ITEM OPERATION 203 via manual entry into a computing system, such as computing systems 100, 151 of FIG. 1 and/or a server system, such as server system 120 of FIG. 1 and/or a database, such as database 170 of FIG. 1, running a parent computing system implemented financial management system implementing process for displaying quantities of inventory items in multiple units of measure 200 and/or directly into process for displaying quantities of inventory items in multiple units of measure 200.

Returning to FIG. 2, in one embodiment, data representing the various units of measure and conversion ratios for a given inventory item is obtained at OBTAIN UNITS OF MEASURE AND UNIT CONVERSION DATA FOR AN INVENTORY ITEM OPERATION 203 from the manufacturer of the given inventory item via a data transfer from a webpage or a computer program product into a computing system, such as computing systems 100, 151 of FIG. 1 and/or a server system, such as server system 120 of FIG. 1 and/or a database, such as database 170 of FIG. 1 running a parent computing system implemented financial management system implementing process for displaying quantities of inventory items in multiple units of measure 200 and/or directly into process for displaying quantities of inventory items in multiple units of measure 200.

Returning to FIG. 2, in one embodiment, data representing the various units of measure and conversion ratios for a given inventory item is provided with the inventory item in the form of a barcode and/or an RFID device on the inventory item and the data representing the various units of measure and the conversion ratios for the inventory item is then scanned, or received, into a computing system, such as computing systems 100, 151 of FIG. 1 and/or a server system, such as server system 120 of FIG. 1 and/or a database, such as database 170 of FIG. 1, running a parent computing system implemented financial management system implementing process for displaying quantities of inventory items in multiple units of measure 200 and/or directly into process for displaying quantities of inventory items in multiple units of measure 200.

Returning to FIG. 2, in other embodiments, data representing the various units of measure and conversion ratios for a given inventory item is obtained at OBTAIN UNITS OF MEASURE AND UNIT CONVERSION DATA FOR AN INVENTORY ITEM OPERATION 203 using any method and/or apparatus for obtaining data, whether available or known at the time of filing or later developed.

Those of skill in the art will readily recognize that the units of measure and conversion ratios obtained at OBTAIN UNITS OF MEASURE AND UNIT CONVERSION DATA FOR AN INVENTORY ITEM OPERATION 203 will vary considerably from business-to-business, user to user, inventory item to inventory item and/or computing system implemented financial management system to computing system implemented financial management system. Consequently, the specific units of measure and conversion ratios discussed herein are chosen for illustrative purposes only and do not limit the scope as set forth in the claims below.

In one embodiment, once the data representing the various units of measure and unit conversion ratios associated with an inventory item is obtained at OBTAIN UNITS OF MEASURE AND UNIT CONVERSION DATA FOR AN INVENTORY ITEM OPERATION 203, process flow proceeds to STORE UNITS OF MEASURE AND UNIT CONVERSION DATA FOR THE INVENTORY ITEM OPERATION 205.

At STORE UNITS OF MEASURE AND UNIT CONVERSION DATA FOR THE INVENTORY ITEM OPERATION 205, the data representing various units of measure and unit conversion ratios associated with the inventory item obtained at OBTAIN UNITS OF MEASURE AND UNIT CONVERSION DATA FOR AN INVENTORY ITEM OPERATION 203 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

Returning to FIG. 2, in some embodiments, the means for storing the data described above are maintained, in whole, or in part, by: the user, or a user computing system; a financial institution; the provider of a parent computing system implemented financial management system employing process for displaying quantities of inventory items in multiple units of measure 200; the provider of process for displaying quantities of inventory items in multiple units of measure 200; a third party service or institution; or any other parties.

In one embodiment, once the data representing various units of measure and unit conversion ratios associated with the inventory item obtained at OBTAIN UNITS OF MEASURE AND UNIT CONVERSION DATA FOR AN INVENTORY ITEM OPERATION 203 is saved at STORE UNITS OF MEASURE AND UNIT CONVERSION DATA FOR THE INVENTORY ITEM OPERATION 205, process flow proceeds to LINK UNITS OF MEASURE AND UNIT CONVERSION DATA FOR THE INVENTORY ITEM TO THE INVENTORY ITEM LISTING OPERATION 207.

At LINK UNITS OF MEASURE AND UNIT CONVERSION DATA FOR THE INVENTORY ITEM TO THE INVENTORY ITEM LISTING OPERATION 207 the data representing the various units of measure and unit conversion ratios obtained at OBTAIN UNITS OF MEASURE AND UNIT CONVERSION DATA FOR AN INVENTORY ITEM OPERATION 203 is "relationally linked", and/or "relationally associated", and/or "connected" to a representation, also called a listing, electronic listing, computing system representation, or electronic representation, of the inventory item, such as the inventory item's name as it would appear in: an inventory listing in electronic spreadsheet or register; an electronic purchase and/or sale document, such as a purchase order; an electronic receipt; or any other representation of the inventory item as it would appear using a computing system, such as computing systems 100, 151 of FIG. 1, and/or a server system, such as server system 120 of FIG. 1, and/or a database, such as database 170 of FIG. 1, and/or any electronic device, know or available at the time of filing or as later developed, and/or a parent computing system implemented financial management system implementing process for displaying quantities of inventory items in multiple units of measure 200, and/or a process for displaying quantities of inventory items in multiple units of measure 200.

Methods and structures for relationally linking data, such as the data obtained at OBTAIN UNITS OF MEASURE AND UNIT CONVERSION DATA FOR AN INVENTORY ITEM OPERATION 203 with a representation of an inventory item are well known to those of skill in the art. Consequently a more detailed discussion of methods and structures for relationally linking data with a representation of an inventory item is omitted here to avoid detracting from the invention. In addition, those of skill in the art will recognize that in some embodiments, LINK UNITS OF MEASURE AND UNIT CONVERSION DATA FOR THE INVENTORY ITEM TO THE INVENTORY ITEM LISTING OPERATION 207 is performed as the data is obtained at OBTAIN UNITS OF MEASURE AND UNIT CONVERSION DATA FOR AN INVENTORY ITEM OPERATION 203 and/or stored at STORE UNITS OF MEASURE AND UNIT CONVERSION DATA FOR THE INVENTORY ITEM OPERATION 205, thereby eliminating the need for a separate LINK UNITS OF MEASURE AND UNIT CONVERSION DATA FOR THE INVENTORY ITEM TO THE INVENTORY ITEM LISTING OPERATION 207.

Once the data representing the various units of measure and unit conversion ratios obtained at OBTAIN UNITS OF MEASURE AND UNIT CONVERSION DATA FOR AN INVENTORY ITEM OPERATION 203 and stored at STORE UNITS OF MEASURE AND UNIT CONVERSION DATA FOR THE INVENTORY ITEM OPERATION 205 is relationally linked, or connected, to the representation of the inventory item at LINK UNITS OF MEASURE AND UNIT CONVERSION DATA FOR THE INVENTORY ITEM TO THE INVENTORY ITEM LISTING OPERATION 207, process flow proceeds to OBTAIN SELECTED INVENTORY ITEM QUANTITY IN BASE UNITS OF MEASURE OPERATION 209.

At OBTAIN SELECTED INVENTORY ITEM QUANTITY IN BASE UNITS OF MEASURE OPERATION 209 the quantity of the inventory item selected by the user in base, or first, units of measure, is obtained for use by process for displaying quantities of inventory items in multiple units of measure 200. In one embodiment the quantity of inventory item is selected by the user by entering the quantity into a user interface screen using a user interface device such as a keyboard 107, 157, or a mouse 111, 161 of FIG. 1. Returning to FIG. 2, once the selected quantity is entered by the user, in one embodiment, process for displaying quantities of inventory items in multiple units of measure 200 collects the data relating to the selected quantity, either by providing the user interface screen or by another interface.

FIG. 3A is a representation of one embodiment of a display screen layout 300A in accordance with one embodiment of process for displaying quantities of inventory items in multiple units of measure 200. As seen in FIG. 3A, in one example, display screen layout 300A is an electronic representation of a purchase order, as it might be generated using a computing system implemented financial management system implementing process for displaying quantities of inventory items in multiple units of measure 200. Those of skill in the art will readily recognize that while an electronic representation of a purchase order was chosen for illustrative purposes, display screen layout 300A could be, in other embodiments, any electronic representation of any inventory related transaction, such as, for example a transaction receipt, a shipping slip, a general inventory listing, an available to promise window, or any other transaction related document and or screen layout.

As seen in FIG. 3A, in one embodiment, display screen layout 300A includes: vendor window 301, listing the vendor "Hometown Hardware" in this example; transaction# window 303, listing the transaction number "1-0001", in this example; transaction type window 305, showing, as discussed above, that this example of display screen layout 300A is a "purchase order"; from window 307, showing the vendor Hometown Hardware and its address; to window 309, showing the address of the customer, "Customer Number 1" in this example; date window 311; acct# window 313, showing the account number for Customer Number 1 in this example; and inventory item transaction register 350.

As also seen in FIG. 3A, inventory item transaction register 350 includes: inventory item transactions 361, 363, 365, and 367; item column 351, were a representation of inventory items such as "tinting film", "red paint", "vinyl flooring" and "chain" is displayed; description column 353, where description of the inventory items of item column 351 is displayed; rate column 357 showing the price per base, or first, unit of measure for the inventory items listed in item column 351; amount column 359, showing a subtotal cost associated with each inventory item transaction listed in item column 351; subtotal window 371; tax window 373; shipping window 375; and total window 377.

As also seen in FIG. 3A, display screen layout 300A also includes Qty column 355 where selected quantities of inventory items are entered by a user in base, or first, units of measure associated with each of the inventory items. As discussed above, according to one embodiment, process for displaying quantities of inventory items in multiple units of measure 200 collects the data relating to the selected quantity directly from Qty column 355 at OBTAIN SELECTED INVENTORY ITEM QUANTITY IN BASE UNITS OF MEASURE OPERATION 209.

In one embodiment, base, or first, units of measure associated with each of the inventory items are chosen by the user of process for displaying quantities of inventory items in multiple units of measure 200 as user-defined variables. In one embodiment, base, or first, units of measure associated with each of the inventory items are provided as default units of measure by process for displaying quantities of inventory items in multiple units of measure 200 and/or a parent computing system implemented financial management system.

Once the selected quantity of the inventory item in base, or first, units of measure, is obtained at OBTAIN SELECTED INVENTORY ITEM QUANTITY IN BASE UNITS OF MEASURE OPERATION 209, process flow proceeds to CONVERT SELECTED INVENTORY ITEM QUANTITY IN BASE UNITS OF MEASURE INTO OTHER UNITS OF MEASURE USING UNIT CONVERSION DATA FOR THE INVENTORY ITEM OPERATION 211.

At CONVERT SELECTED INVENTORY ITEM QUANTITY IN BASE UNITS OF MEASURE INTO AT LEAST ONE OTHER UNIT OF MEASURE USING UNIT CONVERSION DATA FOR THE INVENTORY ITEM OPERATION 211 the data representing various units of measure and unit conversion ratios associated with the inventory item obtained at OBTAIN UNITS OF MEASURE AND UNIT CONVERSION DATA FOR AN INVENTORY ITEM OPERATION 203 and the selected quantity of the inventory item in base, or first, units of measure, obtained at OBTAIN SELECTED INVENTORY ITEM QUANTITY IN BASE UNITS OF MEASURE OPERATION 209 are used by process for displaying quantities of inventory items in multiple units of measure 200 to convert the selected quantity of the inventory item into at least one other, or second, unit of measure.

In one embodiment, the conversion of the selected quantity of the inventory item from the base, or first unit of measure, into at least one other, or second, unit of measure at CONVERT SELECTED INVENTORY ITEM QUANTITY IN BASE UNITS OF MEASURE INTO AT LEAST ONE OTHER UNIT OF MEASURE USING UNIT CONVERSION DATA FOR THE INVENTORY ITEM OPERATION 211 is accomplished via a processor, such as processors 101, 151, or 121 of FIG. 1, by multiplying the selected quantity of the inventory item, such as one of the quantities listed in Qty column 355 of FIG. 3A, with the appropriate conversion ratio obtained at OBTAIN UNITS OF MEASURE AND UNIT CONVERSION DATA FOR AN INVENTORY ITEM OPERATION 203.

In some embodiments, the selected quantity of the inventory item is converted from the base, or first, unit of measure at CONVERT SELECTED INVENTORY ITEM QUANTITY IN BASE UNITS OF MEASURE INTO AT LEAST ONE OTHER UNIT OF MEASURE USING UNIT CONVERSION DATA FOR THE INVENTORY ITEM OPERATION 211 into several other units of measure, such as third, fourth, fifth, etc. units of measure, as desired and designated by the user of process for displaying quantities of inventory items in multiple units of measure 200.

Once the selected quantity of the inventory item is converted into one or more other units of measure at CONVERT SELECTED INVENTORY ITEM QUANTITY IN BASE UNITS OF MEASURE INTO AT LEAST ONE OTHER UNIT OF MEASURE USING UNIT CONVERSION DATA FOR THE INVENTORY ITEM OPERATION 211, process flow proceeds to DISPLAY SELECTED INVENTORY ITEM QUANTITY IN TWO OR MORE UNITS OF MEASURE OPERATION 213.

At DISPLAY SELECTED INVENTORY ITEM QUANTITY IN TWO OR MORE UNITS OF MEASURE OPERATION 213 the selected quantity of inventory item is displayed in two or more units of measure, in a multiple units of measure display on a display device, discussed below, in response to input from a user via a user interface device.

Referring again FIG. 3A, inventory item transaction register 350 of display screen layout 300A includes inventory item transactions 361, 363, 365, and 367.

In the one specific example shown in FIG. 3A, inventory item transaction 361 involves the inventory item "tinting film" as shown in item column 351 and as described in description column 353 as tinting film, 36"roll. In this example, 36" roll is the base, or first, unit of measure for the inventory item tinting film. The selected quantity of the inventory item tinting film of inventory item transaction 361 in this particular example is 4, as shown in Qty column 355, representing a selected quantity of 4 rolls. As also shown in FIG. 3A, inventory item transaction 361 includes an entry of 78.00 in rate column 357 representing a cost of $78.00 per roll. Amount column 359 includes the entry 312.00 for inventory item transaction 361, representing a total cost of $312.00 for the selected quantity of 4 rolls of inventory item tinting film.

Similarly, in the one specific example shown in FIG. 3A, inventory item transaction 363 involves the inventory item "red paint" as shown in item column 351 and as described in description column 353 as red paint, can. In this example, can is the base, or first, unit of measure for the inventory item red paint. The selected quantity of the inventory item red paint of inventory item transaction 363 in this particular example is 2, as shown in Qty column 355, representing a selected quantity of 2 cans. As also shown in FIG. 3A, inventory item transaction 363 includes an entry of 25.50 in rate column 357 representing a cost of $25.50 per can of red paint. Amount column 359 includes the entry 51.00 for inventory item transaction 363, representing a total cost of $51.00 for the selected quantity of 2 cans of inventory item red paint.

Similarly, in the one specific example shown in FIG. 3A, inventory item transaction 365 involves the inventory item "vinyl flooring" as shown in item column 351 and as described in description column 353 as vinyl flooring, sheet. In this example, sheet is the base, or first, unit of measure for the inventory item vinyl flooring. The selected quantity of the inventory item vinyl flooring of inventory item transaction 365 in this particular example is 1, as shown in Qty column 355, representing a selected quantity of 1 sheet. As also shown in FIG. 3A, inventory item transaction 365 includes an entry of 500.00 in rate column 357 representing a cost of $500.00 per sheet of vinyl flooring. Amount column 359 includes the entry 500.00 for inventory item transaction 365, representing a total cost of $500.00 for the selected quantity of 1 sheet of vinyl flooring.

Similarly, in the one specific example shown in FIG. 3A, inventory item transaction 367 involves the inventory item "chain" as shown in item column 351 and as described in description column 353 as chain, reel. In this example, reel is the base, or first, unit of measure for the inventory item chain. The selected quantity of the inventory item chain of inventory item transaction 367 in this particular example is ½, as shown in Qty column 355, representing a selected quantity of one-half reel. As also shown in FIG. 3A, inventory item transaction 367 includes an entry of 180.00 in rate column 357 representing a cost of $180.00 per reel of chain. Amount column 359 includes the entry 90.00 for inventory item transaction 365, representing a total cost of $90.00 for the selected quantity of ½ reel of chain.

Also shown in the one specific example of FIG. 3A, inventory item transaction register 350 includes subtotal window 371, with an entry of 953.00 representing a total inventory item cost of $953.00, and tax window 373, with an entry of 9.53 representing a 10% tax cost of $9.53. In this specific example, the customer is picking up the purchase so shipping window 375 includes the entry 00.00. Finally, total window 377 includes the entry 962.53 representing the entire purchase order cost of $962.53.

Those of skill in the art will recognize that the choice of information displayed, the organization of the information displayed, and the manner in which the information is displayed in FIG. 3A was made for illustrative purposes only and that other types of information, organization of that information, and manner of displaying the information, can be implemented without departing from the scope as set forth in the claims below. In addition, those of skill in the art will readily recognize that various means for interfacing with, activating, or editing, the information displayed on display screen layouts 300A, 300B, 300C, 300D and 300E or FIGS. 3A, 3B, 3C, 3D and 3E are possible, and that the specific means discussed above do not limit the scope as set forth in the claims below.

As discussed briefly above, in one embodiment, the user selected quantity of an inventory item is displayed in a multiple units of measure display on a display device, such as display devices 111, 165 or 125 of FIG. 1, in two or more units of measure at DISPLAY SELECTED INVENTORY ITEM QUANTITY IN TWO OR MORE UNITS OF MEASURE OPERATION 213 of FIG. 2. As also discussed above, in one embodiment, the multiple units of measure display is generated and displayed in response to input from a user via a user interface device such as keyboard 107, 157 and or mouse 111, 161, of FIG. 1, a touchpad device or any other device for translating user action into electronic signals and/or interaction with process for displaying quantities of inventory items in multiple units of measure 200 of FIG. 2, whether known or available at the time of filing or as later developed.

Referring again to FIG. 3A, in one embodiment, the user input causing a multiple units of measure display to be generated and displayed includes the user using a user interface device, such as a mouse, keyboard, or touch pad, to move a cursor (not shown) over an inventory item entry and clicking in one of the columns, such as item column 351, description column 353, or Qty column 355, of an inventory item transaction register, such as inventory item transaction register 350. In one embodiment, the user input causing a multiple units of measure display to be generated and displayed includes the user moving a cursor (not shown) and hovering it over an entry in one of the columns, such as item column 351, description column 353, or Qty column 355, of an inventory item transaction register, such as inventory item transaction register 350. In one embodiment, the cursor (not shown) acts as a "tool tip" to cause a multiple units of measure display to be generated and displayed. In other embodiments, and inventory item listing is activated by any interface means whether available or known at the time of filing or as developed later.

FIG. 3B is a representation of one embodiment of a display screen layout 300B including a multiple units of measure display 381 in accordance with one embodiment of process for displaying quantities of inventory items in multiple units of measure 200.

Display screen layout 300B of FIG. 3B is substantially identical to display screen layout 300A of FIG. 3A. Consequently, the discussion above with respect to the various elements of display screen layout 300A applies, and is incorporated, here for the similarly labeled elements of display screen layout 300B of FIG. 3B. However, in addition to the common elements of display screen layout 300A of FIG. 3A and display screen layout 300B of FIG. 3B, display screen layout 300B includes multiple units of measure display 381, shown as it would be generated and displayed after user activation of the entry 4 of inventory item transaction 361 in Qty column 355.

As shown in FIG. 3B, multiple units of measure display 381 is displayed within display screen layout 300B, and within the context of the present inventory item transaction 361. In one embodiment, multiple units of measure display 381 includes equivalent selected inventory item quantities; 4 rolls; 44 pounds; and 320 feet for inventory item tinting film of inventory item transaction 361. Consequently, multiple units of measure display 381 provides equivalent inventory item quantities for the inventory item tinting film in terms of linear length and weight for the selected quantity of four rolls.

In one embodiment, multiple units of measure display 381 is a tool-as tip display. In one embodiment, multiple units of measure display 381 is a callout window. In one embodiment, multiple units of measure display 381 is a pull-down menu. In other embodiments, multiple units of measure display 381 is any type of GUI-like display, display window, or display device, whether available or known at the time of filing or as developed later. In one embodiment, multiple units of measure display 381 includes an audio function that verbally announces the equivalent selected quantity in various units of measure using an electronically simulated, or reproduced, audio voice.

FIG. 3C is a representation of one embodiment of a display screen layout 300C including a multiple units of measure display 383 in accordance with one embodiment of process for displaying quantities of inventory items in multiple units of measure 200.

Display screen layout 300C of FIG. 3C is substantially identical to display screen layout 300A of FIG. 3A. Consequently, the discussion above with respect to the various elements of display screen layout 300A applies, and is incorporated, here for the similarly labeled elements of display screen layout 300C of FIG. 3C. However, in addition to the common elements of display screen layout 300A of FIG. 3A and display screen layout 300C of FIG. 3C, display screen layout 300C of FIG. 3C includes multiple units of measure display 383, shown as it would be generated and displayed after user activation of the entry 2 of inventory item transaction 363 in Qty column 355.

As shown in FIG. 3C, multiple units of measure display 383 is displayed within display screen layout 300C, and within the context of the present inventory item transaction 363. In one embodiment, multiple units of measure display 383 includes equivalent selected inventory item quantities: 2 cans; 2 gallons; 8 quarts; 16 pints; and 20 pounds for inventory item red paint of inventory item transaction 363. Consequently, multiple units of measure display 383 includes equivalent inventory item quantities in various liquid quantity units and weight units for the selected quantity of inventory item red paint of 2 cans.

In one embodiment, multiple units of measure display 383 is a tool-as tip display. In one embodiment, multiple units of measure display 383 is a callout window. In one embodiment, multiple units of measure display 383 is a pull-down menu. In other embodiments, multiple units of measure display 383 is any type of GUI-like display, display window, or display device, whether available or known at the time of filing or as developed later. In one embodiment, multiple units of measure display 383 includes an audio function that verbally announces the equivalent selected quantity in various units of measure using an electronically simulated, or reproduced, audio voice.

FIG. 3D is a representation of one embodiment of a display screen layout 300D including a multiple units of measure display 385 in accordance with one embodiment of process for displaying quantities of inventory items in multiple units of measure 200.

Display screen layout 300D of FIG. 3D is substantially identical to display screen layout 300A of FIG. 3A. Consequently, the discussion above with respect to the various elements of display screen layout 300A applies, and is incorporated, here for the similarly labeled elements of display screen layout 300D of FIG. 3D. However, in addition to the common elements of display screen layout 300A of FIG. 3A and display screen layout 300D of FIG. 3D, display screen layout 300D of FIG. 3D includes multiple units of measure display 385 shown as it would be generated and displayed after user activation of the entry 1 of inventory item transaction 365 in Qty column 355.

As shown in FIG. 3D, multiple units of measure display 385 is displayed within display screen layout 300D, and within the context of the present inventory item transaction 365. In one embodiment, multiple units of measure display 385 includes equivalent selected inventory item quantities: 1 sheet; 10 square yards; 90 square feet; and 200 pounds for inventory item vinyl flooring of inventory item transaction 365. Consequently, multiple units of measure display 385 includes equivalent inventory item quantities in various area quantity units and weight units for the selected quantity of inventory item vinyl flooring of 1 sheet.

In one embodiment, multiple units of measure display 385 is a tool-as tip display. In one embodiment, multiple units of measure display 385 is a callout window. In one embodiment, multiple units of measure display 385 is a pull-down menu. In other embodiments, multiple units of measure display 385 is any type of GUI-like display, display window, or display device, whether available or known at the time of filing or as developed later. In one embodiment, multiple units of measure display 385 includes an audio function that verbally announces the equivalent selected inventory item quantity in various units of measure using a electronically simulated, or reproduced, audio voice.

FIG. 3E is a representation of one embodiment of a display screen layout 300E including a multiple units of measure display 387 in accordance with one embodiment of process for displaying quantities of inventory items in multiple units of measure 200.

Display screen layout 300E of FIG. 3E is substantially identical to display screen layout 300A of FIG. 3A. Consequently, the discussion above with respect to the various elements of display screen layout 300A applies, and is incorporated, here for the similarly labeled elements of display screen layout 300E of FIG. 3E. However, in addition to the common elements of display screen layout 300A of FIG. 3A and display screen layout 300E of FIG. 3E, display screen layout 300E of FIG. 3E includes multiple units of measure display 387, shown as it would be generated and displayed after user activation of the entry ½ of inventory item transaction 367 in Qty column 355.

As shown in FIG. 3E, multiple units of measure display 387 includes equivalent selected inventory item quantities: ½ reel; 30 meters; 32.8 yards; 98.4 feet; 1181 inches; and 90 pounds for inventory item chain of inventory item transaction 367. Consequently multiple units of measure display 387 includes equivalent inventory item quantities in various length quantity units, and in two measurement systems, American standard and metric, and weight units for the selected quantity of inventory item chain of ½ reel.

In one embodiment, multiple units of measure display 387 is a tool-as tip display. In one embodiment, multiple units of measure display 387 is a callout window. In one embodiment, multiple units of measure display 387 is a pull-down menu. In other embodiments, multiple units of measure display 387 is any type of GUI-like display, display window, or display device whether available or known at the time of filing or as developed later. In one embodiment, multiple units of measure display 387 includes an audio function that verbally announces the equivalent selected inventory item quantity in various units of measure using a electronically simulated, or reproduced, audio voice.

Those of skill in the art will recognize that the choice of information displayed, the organization of the information displayed, and the manner in which the information is displayed in display screen layouts 300A, 300B, 300C, 300D and 300E of FIG. 3A, FIG. 3B, FIG. 3C, FIG. 3D, and FIG. 3E, respectively, was made for illustrative purposes, only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layouts 300A, 300B, 300C, 300D and 300E or FIGS. 3A, 3B, 3C, 3D and 3E are possible, and that the specific means discussed above do not limit the scope as set forth in the claims below.

Returning to FIG. 2, in one embodiment, once the selected quantity of inventory item is displayed in a multiple units of measure display, such as multiple units of measure displays 381, 383, 385, and 387 of FIGS. 3B, 3C, 3D, and 3E, in two or more units of measure at DISPLAY SELECTED INVENTORY ITEM QUANTITY IN TWO OR MORE UNITS OF MEASURE OPERATION 213 of FIG. 2, process flow proceeds to CHANGE SELECTED INVENTORY ITEM QUANTITY? OPERATION 215.

At CHANGE SELECTED INVENTORY ITEM QUANTITY? OPERATION 215 the user of process for displaying quantities of inventory items in multiple units of measure 200 is given the opportunity to change the selected quantity, such as the quantity entered in Qty column 355 of display screen layouts 300A, 300B, 300C, 300D, 300E of FIGS. 3A, 3B, 3C, 3D and 3E, respectively, and essentially create a new multiple units display, without leaving the present display screen and/or context of the present transaction.

In one embodiment, if the user wishes to change the selected quantity, i.e., the user desires a new multiple units display, a "YES" result is returned at CHANGE SELECTED INVENTORY ITEM QUANTITY? OPERATION 215 and process for displaying quantities of inventory items in multiple units of measure 200 returns to OBTAIN SELECTED INVENTORY ITEM QUANTITY IN BASE UNITS OF MEASURE OPERATION 209. From OBTAIN SELECTED INVENTORY ITEM QUANTITY IN BASE UNITS OF MEASURE OPERATION 209, CONVERT SELECTED INVENTORY ITEM QUANTITY IN BASE UNITS OF MEASURE INTO AT LEAST ONE OTHER UNIT OF MEASURE USING UNIT CONVERSION DATA FOR THE INVENTORY ITEM OPERATION 211, DISPLAY SELECTED INVENTORY ITEM QUANTITY IN TWO OR MORE UNITS OF MEASURE OPERATION 213, and CHANGE SELECTED INVENTORY ITEM QUANTITY?

OPERATION 215 are repeated until the user no longer wishes to change the selected quantity.

Once the user no longer wishes to change the selected quantity, i.e., the user does not wish a new multiple units display, a "NO" result is returned at CHANGE SELECTED INVENTORY ITEM QUANTITY? OPERATION 215 and process for displaying quantities of inventory items in multiple units of measure 200 proceeds to END OPERATION 217, where process for displaying quantities of inventory items in multiple units of measure 200 is exited until the next transaction.

Those of skill in the art will recognize that, in on embodiment, all, or a portion of, the user's inventory items that involve multiple units of measure are also operated on by process for displaying quantities of inventory items in multiple units of measure 200 as desired by the user of process for displaying quantities of inventory items in multiple units of measure 200.

In some embodiments, some of, or all of, the data associated with, created by, processed by, used by, or modified by, process for displaying quantities of inventory items in multiple units of measure 200, OBTAIN UNITS OF MEASURE AND UNIT CONVERSION DATA FOR AN INVENTORY ITEM OPERATION 203, STORE UNITS OF MEASURE AND UNIT CONVERSION DATA FOR THE INVENTORY ITEM OPERATION 205, LINK UNITS OF MEASURE AND UNIT CONVERSION DATA FOR THE INVENTORY ITEM TO THE INVENTORY ITEM LISTING OPERATION 207, OBTAIN SELECTED INVENTORY ITEM QUANTITY IN BASE UNITS OF MEASURE OPERATION 209, CONVERT SELECTED INVENTORY ITEM QUANTITY IN BASE UNITS OF MEASURE INTO AT LEAST ONE OTHER UNIT OF MEASURE USING UNIT CONVERSION DATA FOR THE INVENTORY ITEM OPERATION 211, DISPLAY SELECTED INVENTORY ITEM QUANTITY IN TWO OR MORE UNITS OF MEASURE OPERATION 213, CHANGE SELECTED INVENTORY ITEM QUANTITY? OPERATION 215 and/or display screen layout 300A, 300B, 300C, 300D and 300E, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a financial institution; the provider of a parent computing system implemented financial management system employing process for displaying quantities of inventory items in multiple units of measure 200; the provider of process for displaying quantities of inventory items in multiple units of measure 200; a third party service or institution; or any other parties.

Software Architecture

Figure 4:
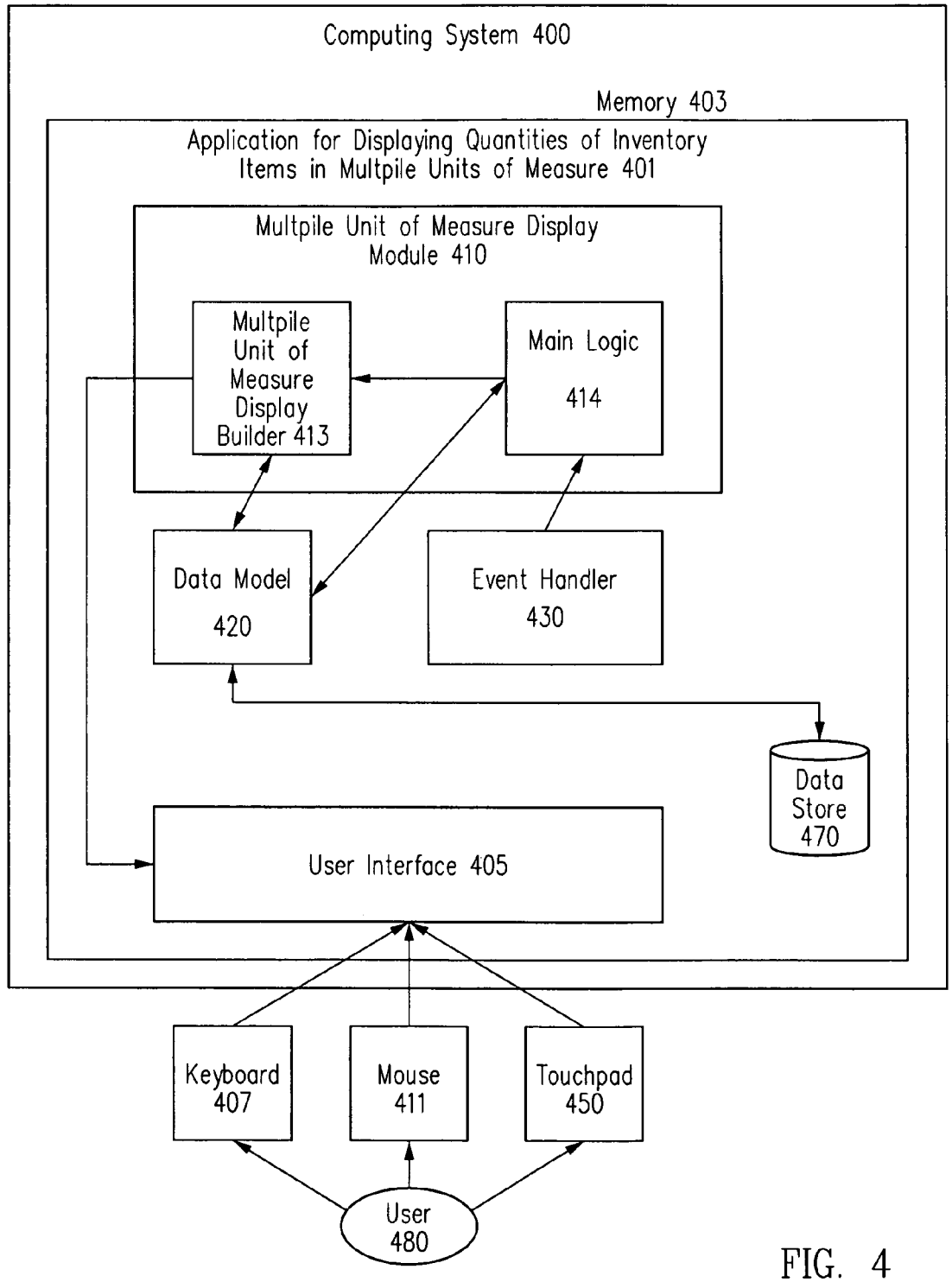
FIG. 4 shows one embodiment of a software architecture for implementing one embodiment.

FIG. 4 shows one embodiment of a software architecture for implementing one embodiment. Shown in FIG. 4 is a computing system 400. In one embodiment, computing system 400 is similar to computing systems 100 and 150 of FIG. 1 discussed above.

As noted above, some embodiments are implemented in a computing device including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing device, whether available or known at the time of filing or as developed later. Some embodiments are implemented in a mobile computing device running mobile operating systems such as Symbian® OS, Windows® Mobile, or any other operating system designed to generally manage operations on a mobile computing device, whether available or known at the time of filing or as developed later. As described more fully below, embodiments can be implemented on computing systems other than a conventional computing device such as, for example, a personal digital assistant, a cell phone, or other computing device capable of processing computer readable data, whether available or known at the time of filing or as developed later. Computing systems also include those in which one or more computing resources are located remotely and accessed via a network, such as a Local Area Network (LAN), Wide Area Network (WAN), the Internet, or other electronic medium in which data may be exchanged between one computing device and one or more other computing device(s), whether available or known at the time of filing or as developed later. Embodiments may be included as add-on software for existing software programs, packages or applications, and embodiments may be a feature of an application that is bundled with a computing device or sold separately. Some embodiments may also be implemented as functionality embedded in hardware devices and systems.

Returning to FIG. 4, computing system 400 includes application for displaying quantities of inventory items in multiple units of measure 401. In one embodiment, all, or part of, application for displaying quantities of inventory items in multiple units of measure 401 resides in a memory 403, such as: memory systems 103, 153 or server memory system 123, or database 170, of FIG. 1; a cache memory, such as cache memory 103A or 153A of FIG. 1; and/or any main memory or mass memory associated with a computing device, such as computing device 400, or computing systems 100 and 150 described above. In one embodiment, all, or part of, application for displaying quantities of inventory items in multiple units of measure 401 resides in any computing device and/or server system, such as computing systems 400, 100, 150, or server system 120, or other device, in another location, or on/in a computer readable medium, and/or any other computer program product, as defined herein. In one embodiment, all, or part of, application for displaying quantities of inventory items in multiple units of measure 401 resides in a webpage or in a web-based system. Embodiments of application for displaying quantities of inventory items in multiple units of measure 401 may be included as add-on software for existing software programs, packages, or applications, and embodiments may be a feature of an application that is bundled with a computing device or sold separately. Some embodiments may also be implemented as functionality embedded in hardware devices and systems.

As shown in FIG. 4, in one embodiment, application for displaying quantities of inventory items in multiple units of measure 401 includes: multiple units of measure display module 410, including multiple units of measure display builder 413 and main logic 414; data model module 420; event handler 430; data store 470 and user interface 405.

In one embodiment, user interface devices such as keyboard 407, mouse 411, and touchpad 450 are operatively coupled to user interface 405, and application for displaying quantities of inventory items in multiple units of measure 401. User interface devices 407, 411 and 450 and user interface 405, provide a user 480 with an interface to application for displaying quantities of inventory items in multiple units of measure 401. In one embodiment, interface 405 includes display screen layouts, such as display screen layouts 300A, 300B, 300C, 300D, and 300E of FIGS. 3A, 3B, 3C, 3D, and 3E, respectively.

In one embodiment, data store 470 is operatively coupled to data model module 420 of application for displaying quantities of inventory items in multiple units of measure 401. In one embodiment, data store 470 is a memory system, such as memory systems 103, 153 or server memory system 123, or database 170, of FIG. 1, or a cache memory, such as cache memory 103A or 153A of FIG. 1, or any main memory or mass memory, associated with a computing device, such as computing systems 100 and 150 described above. In one embodiment, data store 470 is a designated server system or computing device, or a designated potion of a server system or computing device, such as systems 100, 150 and 120. In one embodiment, data store 470 is relational database or a dedicated mass storage device implemented in software, hardware, or a combination of hardware and software. In one embodiment, data store 470 a webpage or a web-based system.

In one embodiment, application for displaying quantities of inventory items in multiple units of measure 401 includes a number of executable code portions and data files. These include code for creating and supporting a user interface, such as user interface 405, code for converting quantity data from one unit of measure to another unit of measure, as well as code for generating display screens, such as display screen layouts 300A, 300B, 300C, 300D, and 300E, discussed above. In one embodiment, application for displaying quantities of inventory items in multiple units of measure 401 of FIG. 4 is responsible for orchestrating the operation of a process for displaying quantities of inventory items in multiple units of measure, such as process 200 of FIG. 2 discussed above. As discussed above, application for displaying quantities of inventory items in multiple units of measure 401 of FIG. 4 includes multiple units of measure display module 410, which in turn includes multiple units of measure display builder 413 and main logic 414.

Multiple units of measure display module 410, multiple units of measure display builder 413, and main logic 414 need not be discrete software modules. The particular software architecture of FIG. 4 is shown for illustrative purposes. Consequently, those of skill in the art will recognize that other configurations are contemplated by, and are within the scope of, the present invention as claimed below and the invention may be practiced and implemented using numerous other architectures and in numerous other environments.

In one embodiment, data store 470 includes unit of measure and unit of measure conversion data created by user 480, and/or a computing system implemented financial management system, such as computing system implemented financial management systems 180 and 190 of FIG. 1, and/or application for displaying quantities of inventory items in multiple units of measure 401 of FIG. 4. In one embodiment, multiple units of measure display module 410 includes various components that operate together to implement application for displaying quantities of inventory items in multiple units of measure 401. In one embodiment, user interface 405 displays inventory item listings, inventory item transaction listings, selected quantities of inventory items, and multiple units of measure displays such as those included in display screen layouts 300A, 300B, 300C, 300D and 300E, as discussed above with respect to FIGS. 3A, 3B, 3C, 3D and 3E, on a user's display device, such as display devices 115, 165 and 125, discussed above with respect to FIG. 1.

Returning to FIG. 4, in one embodiment, event handler 430 detects user interaction with any of the user interface devices such as keyboard 407, mouse 411, and touchpad 450 and notifies the other components of the interaction. In one embodiment, main logic 414 orchestrates the generation and display of a multiple units of measure display, such as multiple units of measure displays 381, 383, 385 and 387 of FIGS. 3B, 3C, 3D and 3E, respectively, including requesting data from, and sending data to, other components of multiple units of measure display module 410. In one embodiment, multiple units of measure display builder 413 accepts as input data, the parameters specifying what data, such as, for example, the selected quantity from Qty column 355 of FIGS. 3A, 3B, 3C, 3D and 3E, or the inventory item from item column 351 of FIGS. 3A, 3B, 3C, 3D and 3E. In one embodiment, multiple units of measure display builder 413 then obtains and/or updates the relevant conversion data.

Returning to FIG. 4, in one embodiment, based on these parameters and data, multiple units of measure display builder 413 then creates a multiple units of measure display, such as multiple units of measure displays 381, 383, 385, 387 of FIGS. 3B, 3C, 3D, and 3E, respectively, on a user interface 405. In one embodiment, data model module 420 retrieves the unit conversion data from data store 470 and provides the data to the other components, such as multiple units of measure display builder 413.

As noted above, the architecture of FIG. 4 represents but one possible implementation of a application for displaying quantities of inventory items in multiple units of measure 401 and other embodiments, such as one in which the elements of the invention are implemented on a computer, or computing device other than the user's computing device, or one with different components and/or organization, interconnection and operational relation, are equally possible and will be readily apparent to one of skill in the art.

Figure 5:
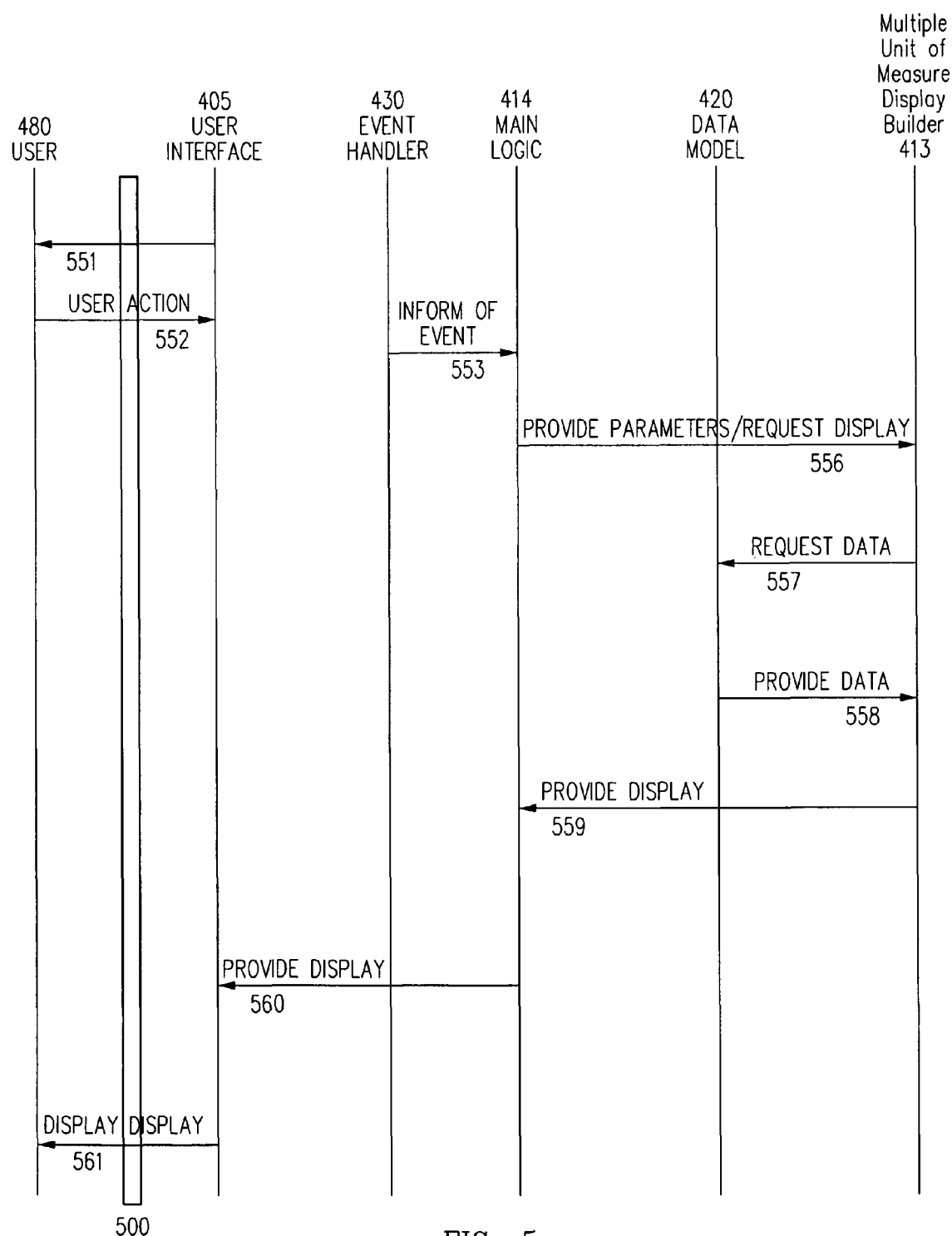
FIG. 5 is an interaction diagram illustrating interactions among system components according to one embodiment.

FIG. 5 is an interaction diagram illustrating interactions among system components according to one embodiment. User-system boundary 500 represents the division between the user 480 of the application for displaying quantities of inventory items in multiple units of measure, such as application for displaying quantities of inventory items in multiple units of measure 401, to the left of user-system boundary 500, and the components of the application for displaying quantities of inventory items in multiple units of measure, such as application for displaying quantities of inventory items in multiple units of measure 401, to the right of user-system boundary 500.

Viewing FIGS. 4 and 5 together, user interface 405 displays the appropriate interface to user 480 at 551. User 480 takes an action at 552 which is interpreted by user interface 405. Any number of interactions between user 480 and user interface 405 may occur before a multiple units of measure display, such multiple units of measure displays 381, 383, 385 and/or 387 of FIGS. 3B, 3C, 3D, and 3E, respectively is generated. For example, user 480 can change the selected inventory item quantity in Qty column 355 or the inventory item itself in item column 351 of FIGS. 3A, 3B, 3C, 3D, and/or 3D. In response, the application for displaying quantities of inventory items in multiple units of measure, such as application for displaying quantities of inventory items in multiple units of measure 401 of FIG. 4, redraws the multiple units of measure display, such multiple units of measure displays 381, 383, 385 and/or 387 of FIGS. 3B, 3C, 3D, and 3E, respectively, so as to provide the desired multiple units of measure display and to start the process for generating and displaying the multiple units of measure display.

When user 480 performs an action causing a multiple units of measure display, such multiple units of measure displays 381, 383, 385 and/or 387 of FIGS. 3B, 3C, 3D, and 3E, respectively, to be generated and displayed, event handler 430 informs main logic 414 at 553 of the occurrence of the user initiated event. Main logic 414 then determines the appropriate multiple units of measure display parameters and units of measure conversion based on the user initiated event. Main logic 414 then sends a request to multiple units of measure display builder 413 at 556 for the multiple units of measure display. In one embodiment at 556 the request includes the appropriate multiple units of measure display parameters.

Multiple units of measure display builder 413 requests any needed data, such as the units of measure conversion data and selected quantity of inventory item in the multiple units of measure display's parameters, from data model module 420 at 557. Data model module 420 then retrieves the requested data from data store 470 and provides the data to multiple units of measure display builder 413 at 558. Based on this data, and the parameters provided within the multiple units of measure display request, multiple units of measure display builder 413 creates a multiple units of measure display, such multiple units of measure displays 381, 383, 385 and/or 387 of FIGS. 3B, 3C, 3D, and 3E, respectively, and provides the multiple units of measure display to main logic 414 at 559. Finally, main logic 414 sends a request to user interface 405 to display the multiple units of measure display to user 480 at 560, and the multiple units of measure display is displayed at 561.

It will be apparent to those of skill in the art that the conceptual components of FIGS. 4 and 5, and the relationships shown and discussed, represent one possible means of implementing the invention. One skilled in the art will also recognize that other arrangements and combinations of components, both physical and conceptual; can also be used to implement other embodiments, without departing from the characteristics of the invention as set forth in the claims below.

Using the method and apparatus for displaying quantities of inventory items in multiple units of measure disclosed herein, a desired quantity of an inventory item is displayed in multiple units of measure associated with the inventory item so that the conversion of units is provided automatically, without additional calculation, user effort, or opportunity for error.

In addition, in one embodiment, the method and apparatus for displaying quantities of inventory items in multiple units of measure disclosed herein displays a desired quantity of an inventory item in multiple units of measure associated with the inventory item within the context of a single interface display screen and within the context of the present transaction. Consequently, purchasing, warehousing, and sale of the inventory item can be conducted and concluded without ever having to leave the context of the present transaction or the present display screen.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or, structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "storing", "linking", "providing", "displaying", "calculating", "multiplying" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for displaying quantities of inventory items in multiple units of measure, discussed herein, are identified using a particular nomenclature for ease of description and understanding, but other nomenclature is often used in the art to identify equivalent operations.

In addition, the order of operations depicted in the FIG.s and discussed above was chose for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A system for displaying quantities of inventory items in multiple units of measure comprising:
    a computing system;
    a display device; and
    a processor for executing a process for displaying quantities of inventory items in multiple units of measure, the process for displaying quantities of inventory items in multiple units of measure comprising:
    relationally linking one or more nonphysical units of measure involving at least one attribute of an inventory item and at least one conversion ratio for converting between at least two of the units of measure to a representation of the inventory item;
    converting a selected quantity of at least one attribute of the inventory item, expressed in a first unit of measure, into a second unit of measure, the conversion using the units of measure for the inventory item and the at least one conversion ratio; and
    displaying the selected quantity of the inventory item in at least two different units of measure in a multiple units of measure display.

2. The computing system implemented process for displaying quantities of inventory items in multiple units of measure of claim 1, wherein:
    at least one of the at least one attributes is a usage attribute, and at least one of the units of measure involves at least one of program usage, processor usage, a resource consumed per unit time, and cost per consumption unit.

3. The computing system implemented process for displaying quantities of inventory items in multiple units of measure of claim 1, wherein:
    at least one of the at least one attributes is a capacity attribute, and at least one of the units of measure involves capacity per unit time.

4. The system for displaying quantities of inventory items in multiple units of measure of claim 1, wherein:
    the representation of the inventory item is part of an inventory item transaction, the inventory item transaction, and the representation of the inventory item, being displayed on a display screen.

5. The system for displaying quantities of inventory items in multiple units of measure of claim 4, wherein:
    the multiple units of measure display is displayed in the same display screen as the inventory item transaction and the representation of the inventory item.

6. A computer program product for displaying quantities of inventory items in multiple units of measure comprising:
    a computer readable medium;
    and computer program code, encoded on the computer readable medium, comprising computer readable instructions for:
    relationally linking one or more nonphysical units of measure involving at least one attribute of an inventory item and at least one conversion ratio for converting between at least two of the units of measure to a representation of the inventory item;
    converting a selected quantity of at least one attribute of the inventory item, expressed in a first unit of measure, into a second unit of measure, the conversion using the units of measure for the inventory item and the at least one conversion ratio; and
    displaying the selected quantity of the inventory item in at least two different units of measure in a multiple units of measure display.

7. The computer program product for displaying quantities of inventory items in multiple units of measure of claim 4, wherein:
    the representation of the inventory item is part of an inventory item transaction, the inventory item transaction, and the representation of the inventory item, being displayed on a display screen.

8. The computer program product for displaying quantities of inventory items in multiple units of measure of claim 7, wherein:
    the multiple units of measure display is displayed in the same display screen as the inventory item transaction and the representation of the inventory item.

* * * * *

UNITED STATES PATENT AND TRADEMARK OFFICE
CERTIFICATE OF CORRECTION

| | |
|---|---|
| PATENT NO. | : 8,015,078 B1 |
| APPLICATION NO. | : 11/491432 |
| DATED | : September 6, 2011 |
| INVENTOR(S) | : Michael Amore Scalora et al. |

It is certified that error appears in the above-identified patent and that said Letters Patent is hereby corrected as shown below:

In the Claims

In Column 28, Line 48, Claim 7, replace "of claim 4" with --of claim 6--.

Signed and Sealed this
Twenty-eighth Day of January, 2014

Michelle K. Lee
*Deputy Director of the United States Patent and Trademark Office*